United States Patent Office 3,309,316
Patented Mar. 14, 1967

3,309,316
LOW CORROSIVITY NITROGEN AND SULFUR-CONTAINING DETERGENT FOR LUBRICANT OIL FORMULATIONS
Herbert A. McNinch, Portage, and Robert E. Karll, Munster, Ind., assignors to Standard Oil Company, Chicago, Ill., a corporation of Indiana
No Drawing. Filed July 2, 1964, Ser. No. 380,039
11 Claims. (Cl. 252—47.5)

This invention relates to novel nitrogen and sulfur-containing compounds, their preparation and their use in lubricant oil formulations and more particularly pertains to said novel compounds derived from alkenyl substituted succinic acid or anhydride or acyl halide reacted with sulfur and an amine and the use of said novel compounds as substantially ashless low corrosivity detergents in lubricating oil formulations.

It is known that oil-soluble alkylated maleic acids having alkyl groups containing more than 12 carbon atoms and usually up to about 30 carbon atoms are useful in preventing corrosion of ferrous metals. These alkylated maleic acids are usually alkyl subsituted succinic acids since they are derived through the reaction of maleic anhydride with a substantially saturated $C_{12}$ to $C_{30}$ aliphatic hydrocarbon followed by hydrolysis of the resulting substituted succinic anhydride to obtain the substituted succinic acid. In general the substantially saturated aliphatic hydrocarbon reacted with maleic anhydride has sufficient unsaturation that the resulting substituted succinic anhydride, especially those more readily obtained, are alkenyl substituted succinic anhydride products.

Recently there has been developed a new class of lubricant oil detergents which are obtained by reacting alkenyl substituted maleic anhydrides, acids, or acyl halides with an amine and a borating agent. According to U.S. Patent 3,087,936 alkenyl substituted succinic acids, anhydrides, or acyl halides having at least about 50 carbon atoms in the alkenyl substituent are first reacted with an amine to form an acylated amine reaction product at 80 to 250° C. and preferably under reaction conditions whereat water or hydrogen halide by-product is driven off forming amides, imides, and mixtures thereof. Thereafter, the acylated amine is reacted with a boron compound such as boron oxide, halide acids of boron and esters of said acids at a temperature between about 50 and 250° C. to form the borated acylated amine. As amine reactants for the preparation of said borated acylated amines there can be used ammonia, aliphatic amines, aromatic amines, heterocyclic amines, carbocyclic amines, and hydroxy amines. The amine reactant, of course, must be a primary or secondary amine. U.S. Patent 3,087,936 discloses a large number of specific amines useful in the preparation of borated acylated amines and exemplifies the preparation of many diverse acylated amines and the ultimate boration of many and varied acylated amine products.

It is known, for example from U.S. Patent 3,087,936, that preferably the alkenyl substituent on the substituted succinic anhydride acid or acyl halide is derived from an olefin polymer having a molecular weight of from about 750 to 5,000. Also it is known that higher molecular weight olefin polymers having molecular weights substantially above 5,000, e.g. from 5,000 to 100,000 in addition to being part of an oil-soluble detergent additive also impart some viscosity index improving properties to the final formulated lubricant oil composition.

For the preparation of the aforementioned acylated amines the amine reactant is preferably a polyamine especially the polyalkylene polyamines and more particularly preferred are the polyethylene polyamines derived by reacting ethylene dichloride with ammonia. Such amines include, of course, ethylene diamine as well as triethylene tetraamine, tetraethylene pentamine, diethylene triamine, and mixtures thereof such as for example the polyethylene polyamine commercial mixture having an average composition corresponding to tetraethylene pentamine. Similar polyalkylene polyamines such as derived from propylene dichloride and ammonia are also particularly preferred polyalkylene polyamines.

The reaction of the polyfunctional alkenyl substituted succinic anhydride with the polyfunctional polyalkylene polyamines can be controlled by proper choice of ratios of reactants to produce products which are substantially only a monosuccinimide, the diamide of a substituted succinic acid, or a disuccinimide, especially with the polyalkylene polyamines having terminal primary amino ($-NH_2$) groups, for example the disuccinimide of tetraethylene pentamine wherein the nitrogens in the 1 and 5 positions of tetraethylene pentamine are each members of an alkylene substituted succinimide. Also, as can be appreciated, the acylation of the polyamines with the polyfunctional alkylene succinic anhydrides can lead to complex mixtures of amines, imides, both open chain and cyclic in nature. However, such complexities do not detract from the exceptional usefulness of the borated product as detergents for lubricant oil formulations.

We have discovered a new class of lubricant oil additives which have detergent-dispersant properties and also have the ability to inhibit corosion of bearing metals when our new additives are incorporated into lubricant oil formulations. These new compositions are obtained by sulfurizing an alkenyl substituted succinic anhydride by reacting the alkenyl substituted succinic anhydride with elemental sulfur. The sulfurized alkenyl substituted succinic anhydride is then reacted with an amine to form an acylated amine. Preferably the amine reactant is a polyalkylene polyamine. The mole ratio of sulfurized alkenyl succinic anhydride to the polyalkylene polyamine for the purposes of this invention can vary from about $4/10$ mole to 1 mole of alkyl polyamine containing two primary ($-NH_2$) amino groups per mole of sulfurized alkenyl succinic anhydride. The use of the alkylene polyamine in mole ratios in the lower portion of said range favor the formation of mainly discuccinimides of the sulfurized alkenyl succinic anhydrides. The use of the polyamines in the higher mole ratios of said range favor the formation of mainly monosuccinimides.

The sulfurizing of the alkenyl succinic anhydrides is accomplished by reacting the alkenyl substituted succinic anhydride with elemental sulfur at a temperature above 300° F. up to 400 to 450° F. The sulfurization of alkenyl substituted succinic anhydrides is known. For example, the sulfurization of alkenyl substituted succinic anhydrides having 12 to 30 carbon atoms is disclosed in U.S. Patent 2,279,688. However, for the purposes of this invention the amount of sulfur reacted with the alkenyl substituted succinic anhydride need not be so great as to incorporate as much as 20% sulfur into the alkenyl substituted succinic anhydride as taught in U.S. Patent 2,279,688. For the purposes of this invention it is preferred to react from 0.5 to 2 gram atoms of sulfur per mole of alkenyl substituted succinic anhydride whose alkenyl group contains 50 or more carbon atoms and is derived from an olefin polymer substantially aliphatic in nature and having 50 to 200 carbon atoms. Such olefin polymers are those derived from the polymerization of mono-olefinic hydrocarbons containing 2 to 6 carbon atoms such as ethylene, propylene, butylenes, amylenes, etc. in the presence of a Friedel-Crafts type catalyst, e.g. aluminum chloride. Small amounts of vinyl aromatics admixed with the aforementioned $C_2$ to $C_6$ alkene monoolefins to produce polymeric materials are also useful and the resulting products with a molecular weight in the range of 500 to 100,000 are useful. The polymers derived from the use of small amounts of vinyl aromatics, especially less than 10 mole percent vinyl aromatics, are, because the aromatic rings do not appear in the polymer chain but rather are substituents of the polymer chain, still substantially aliphatic in nature.

The reaction between sulfur and the alkenyl substituted succinic anhydrides does not involve only the reaction between sulfur and the few unsaturated groups in the alkenyl chain substituent but also appears to involve reaction between sulfur and the anhydride ring. The latter is apparent from the liberation of hydrogen sulfide when the sulfurized alkenyl substituted succinic anhydride is reacted with the amine to form the acid amine. The sulfurized alkenyl substituted succinic anhydride acylated amines prepared according to this invention retain the detergency-dispersancy properties of the acylated amines having no sulfur in their molecule but bring into the molecule the ability to inhibit in lubricant oil formulations corrosion of bearing metals. One of the drawbacks of the acylated amine detergent-dispersant products obtained from the acylation of the amines and polyamines with alkenyl substituted succinic anhydrides is found when a fully formulated lubricant oil composition is being prepared. It is not that the non-sulfur containing acylated amine is incompatible with other lubricant additives such as the anti-rusts, the anti-wear, the alkalinity maintaining (high based), viscosity index improving, pour depressing, antifoam, extreme pressure agents, but because of the exceptional detergency and dispersancy properties of said non-sulfur containing acylated amines. More of these additive agents must be used to obtain a lubricant oil formulation especially for motor oils meeting or exceeding the maximum severity standards established for motor oils used to lubricate spark-ignited internal combustion engines and diesel engines. However, the sulfurized $C_{50}$ to $C_{200}$ alkenyl substituted succinic anhydride polyalkylene polyamine reaction products of this invention are efficient detergent-dispersant additives having the additional property of inhibiting the corrosion of bearing metals and have the additional feature of requiring in balanced lubricant oil formulations less of the other aforementioned additive agents than would be required for the non-sulfur containing acylated amines.

The acylated amines prepared from alkenyl substituted succinic anhydride are known not to be suitably oil soluble for lubricant oil formulations where the alkenyl substituents contain 12 to 30 carbon atoms. The sulfurized alkenyl succinic anhydrides having 12 to 30 carbon atoms in the alkenyl substituent are likewise not suitable for lubricant oil formulations especially when converted to the acylated amine product. It appears necessary for suitable oil solubility of the acylated amine product that there be present in the alkenyl substituent of the sulfurized alkenyl succinic anhydride at least 50 carbon atoms, e.g. 50 to 200 carbon atoms, and for the purposes of this invention it is preferred that said alkenyl substituents having 50 to 200 carbon atoms are derived from liquid polypropylenes and liquid polybutenes.

The acylation of the amine and especially the polyalkylene polyamines with the sulfurized alkenyl succinic anhydride is an exothermic reaction. The first reaction probably occurs by opening of the anhydride ring to form a carboxy monoamide product when the preferred diprimary amine polyalkylene polyamine is employed in the ratio of 0.5 to 1 mole per mole of the sulfurized alkenyl succinic anhydride. Advantage can be taken of the exothermic reaction by permitting the heat of reaction to heat the reaction mixture to a temperature above the starting temperature and up to a temperature near that at which by-product water can be initially readily removed. It is preferred that the acylation reaction be carried out in the presence of a reaction diluent. Where it is desired to recover the acylated amine product per se, the acylation reaction can be carried out conveniently in the presence of a diluent which is also a solvent for the sulfurized alkenyl succinic anhydride and boils at a temperature in the range of 150 to 300° C., for such diluent solvents can be readily removed by distillation at ambient pressure or at moderate reduced pressures. The removal of such solvents will also provide for the removal of by-product water and at the same time provide reaction conditions enhancing the formation of imides whose formation, of course, provides the by-product water. The acylation reaction can also be conveniently carried out in the presence of light hydrocarbon oils as the diluent solvent. But in this case the by-product water of the imide formation is removed by other means as, for example, conveniently by bubbling nitrogen through the reaction solution. Other diluent solvents having the boiling point and viscosity characteristics of light mineral oils such as the liquid polyolefins having molecular weight in the range of 500 to 10,000 are also useful. The polyolefin solvents need not be removed for they have a beneficial use as lubricant additives.

As hereinbefore stated, the preferred sulfurized alkenyl succinic anhydride acylated amine products are those derived from the sulfurized polybutenyl succinic anhydrides resulting from the reaction of sulful with a polybutenyl succinic anhydride and especially those having a polybutenyl substituent derived from a liquid polybutenyl having a molecular weight in the range of 700 to 1,100. Such polybutenyl succinic anhydrides have, therefore, a molecular weight in the range of 800 to 1,100. The preferred sulfurized polybutenyl succinic anhydrides are those obtained by reacting one gram atom of sulfur per mole of the polybutenyl succinic anhydrides having a molecular weight in the range of 800 to 1,100. The preferred diprimary polyalkylene polyamines to be acylated with the sulfurized polybutenyl succinic anhydride are those containing five nitrogens in their molecule and especially tetraethylene pentamine or a commercially available mixture of polyethylene polyamines having an average composition corresponding to tetraethylene pentamine. Said commercial mixture corresponding to tetraethylene pentamine contains polyethylene polyamines above and below tetraethylene pentamine as well as tetraethylene pentamine. The aforementioned 0.5 to 1.0 mole of diprimary polyalkylene polyamine per mole of sulfurized alkenyl succinic anhydride is also preferred for the tetraethylene penta amine reactant. The acylation reaction is carried out under temperature conditions which favor the imide structure formation as hereinbefore stated. It is known that temperatures above 150° F. and especially within the range of 200 to 400° F. provided the necessary temperature conditions favoring the formation of the imide structure.

The sulfurization of the alkenyl substituted succinic anhydrides can be carried out by combining elemental sulfur with the alkenyl substituted succinic anhydride and the resulting mixture heated to a temperature in the range of 250 to 450° F. The sulfurization can also be carried out by reacting sulfur with the alkenyl succinic anhydride dissolved in a hydrocarbon. Advantageously such hydrocarbon solvents as the light lubricant base oil hydrocarbons corresponding to the SAE 5 to SAE 10 oils or the liquid polyolefins having a molecular weight in the range of 500 to 10,000 can be used. The sulfurized alkenyl succinic anhydride per se can be reacted with the amine reactant or a solution of the sulfurized alkenyl succinic anhydride. Advantageously, the aforementioned solutions in the light mineral oil and polyolefin solvents can be reacted with the amine reactant to obtain the acylated amine product per se or advantageously a solution thereof in said light mineral oil or polyolefin solvent. The acylation as hereinbefore disclosed can also be carried out in the presence of readily removable reaction solvents when it is desired to recover the acylated product per se. When the aforementioned light mineral oils and liquid polyolefin solvents are employed for the sulfurization step and the acylation step the acylated amine products of this invention can be obtained as 40 to 60 weight percent concentrates. Advantageously, such concentrates can be used to dissolve other lubricant oil additives. Such a composite concentrate can be readily diluted with mineral oil lubricant base stocks for the preparation of a completely formulated lubricant oil composition. Also said concentrates of the acylated amine product of this invention can be blended with concentrates of other lubricant oil additives and mineral oil lubricant base stocks for example, through proportioning meters to continuously prepare fully formulated lubricant oil compositions ready for packaging.

The products of this invention and their preparation can be more readily understood from the following illustrative examples.

*Example 1*

One gram mole of polybutenyl succinic anhydride having a molecular weight of about 960 is heated to 250° F. in a nitrogen atmosphere. There is then added 1.1 gram atom of sulfur and the resulting mixture is heated in a nitrogen atmosphere at 360° F. for about two hours. The resulting product is viscous at ambient temperature. Unreacted sulfur can be readily removed from the resulting sulfurized product by dissolving it in benzene, toluene, xylene, naphtha, and then filtering the resulting solution. The sulfurized polybutenyl succinic anhydride can be recovered by distilling from the filtered solution the hydrocarbon solvent. The sulfurized polybutenyl succinic anhydride product has an acid number somewhat below that of the starting material but in general not less than about 90% of that of the starting unsulfurized alkenyl succinic anhydride.

To about 0.5 mole of the foregoing sulfurized polybutenyl succinic anhydride dissolved in toluene as a 40% solution heated to 150° F. there is slowly added 0.25 mole of tetraethylene pentamine at a rate to permit the exothermic reaction to heat the reaction mixture to about 210° F. The evolution of hydrogen sulfide is readily detected. Thereafter the reaction mixture is heated first to distill off water as a water-toluene azeotrope until no further water comes off and then the remainder of the toluene is distilled off to a pot temperature of 240° F. at which temperature the distillation residue is held for 25 to 30 minutes. The distillation residue is dissolved in solvent extracted SAE 5W oil to provide a concentrate of about 60 weight percent of the resulting acylated tetraethylene pentamine product.

*Example 2*

Two hundred grams of a solution containing 48.3 percent by weight polybutenyl succinic anhydride having a molecular weight of about 945 (1.02 mole of polybutenyl succinic anhydride) dissolved in a mixture of SAE 5W oil and liquid polybutene of a molecular weight of about 850 is heated to 275° F. under a nitrogen atmosphere. There is added thereto 35 grams (1.09 gram atoms) of sulfur. The resulting mixture is heated for about 6 hours at 350° F. The resulting solution is filtered through coarse Celite. The filtrate has an acid number of 53.2 mg. KOH per gram which acid number is about 90.5% of the starting unsulfurized polybutenyl succinic anhydride.

To a 1700 gram portion of the above filtrate heated to 227° F. there is slowly added 77 grams of commercial tetraethylene pentamine at a rate to heat the resulting reaction mixture to about 260° F. The ratio of reactants employed is 0.5 mole of said commercial tetraethylene pentamine per mole of the sulfurized polybutenyl succinic anhydride. During the addition of the tetraethylene pentamine the evolution of hydrogen sulfide is readily detected. The resulting reaction mixture is heated while bubbling nitrogen into it until by-product water no longer is being removed. The resulting solution of acylated amine has an acid number of 2.8 mg. KOH per gram and has an odor characteristic of sulfur compound but not an objectionable odor. By chemical analysis it is found that the solution contains 1.41% nitrogen and 0.79% sulful by weight. The amount of sulfur in the product corresponds to about 60% of the sulfur charged.

*Example 3*

To 500 grams of a polybutenyl succinic anhydride product containing about 96% by weight polybutenyl succinic anhydride of a molecular weight of 995 add 325 grams of solvent extracted SAE 5 mineral oil and heat the mixture to 250° F. Then add to this hot solution 17 grams sulfur and further heat the mixture to 375° for about five hours. Cool the reaction mixture to about 230° F. and filter. To the filtrate add about 0.35 mole of diethylene triamine slowly to obtain a final temperature of about 250° F. This provides about 0.7 mole of diethylene triamine per mole of sulfurized polybutenyl succinic anhydride. Upon addition of the polyamine the odor of evolved hydrogen sulfide will be noticeable. After all of the polyamine has been added, bubble nitrogen through the reaction mixture while heating it to about 300° F. and while maintaining this temperature for about 60 minutes.

By the foregoing procedure there may be produced a solution containing about 60 weight percent of diethylene triamine acylated with sulfurized polybutenyl succinic anhydride, a mixture of imides and amides, in the mineral oil solvent. This solution useful as a concentrate in formulating lubricant oil compositions should have a sulfur content of about 1% by weight and a nitrogen content of about 1.6 to 1.7% by weight.

*Example 4*

A solution comprising 500 grams of 80% by weight polybutenyl succinic anhydride having a molecular weight of about 800 (the remaining 100 grams are polybutene of a molecular weight of about 700) is dissolved in about 700 grams of SAE 10 mineral oil. Heat this solution to 300° F. and add thereto 18 grams sulfur and heat to 375° F. for about four hours. Cool the resulting solution to 200° F. and filter. The filtrate is combined with 72 grams triethylene tetramine which is added slowly to obtain a final temperature of about 235° F. This provides about one mole of triethylene tetramine per mole of the sulfurized polybutenyl succinic anhydride. After all of the triethylene tetramine is added, add nitrogen through a sparge plate and by the application of external heat increase the temperature of the solution to 280–290° F. for about 45 minutes.

Through the use of the foregoing procedure one may obtain a 40% by weight solution of triethylene tetramine acylated with sulfurized polybutenyl succinic anhydride which solution contains predominantly the mono N-polybutenyl succinimide of triethylene tetramine. The sulfur and nitrogen content of said solution should be about 0.9 and 2.4 weight percent, respectively.

To prepare lubricant oil compositions suitable as crankcase lubricants to meet the requirements of high service severity it is advantageous to use an amount of the acylated amine or solution thereof to provide at least 0.5 weight percent of the amine acylated with sulfurized polybutenyl succinic anhydride and preferably to provide about 2 to 4 weight percent of said acylated product. Also for said crankcase lubricant oil compositions it is advantageous to employ an anti-wear agent, an anti-oxidation agent, an anti-rust agent, and an anti-foaming agent. When said crankcase lubricant oil compositions are desired having multi-viscosity characteristics, for example, to formulate a 10–30 viscosity lubricant oil composition, there are also employed the additive agents providing such multi-viscosity characteristics. In formulating crankcase lubricant compositions it is preferred to use zinc dialkyldithiophosphates in the weight percent range of from 1 to 3 and preferably zinc dialkyldithiophosphates having 3 to 12 carbon atoms in the alkyl groups. These zinc dialkyldithiophosphates are recognized in the art as providing anti-wear and anti-oxidation functions in the lubricant oil composition. If desired, polymeric fatty acid anti-wear agents can also be used in combination with the zinc dialkyldithiophosphates. To provide alkalinity control of the crankcase lubricant oil compositions during use it is advantageous to use an oil-soluble alkaline earth metal salt, preferably oil-soluble alkaline earth metal sulfonates, e.g. alkaline earth metal salts of mahogany acids, used either as the normal alkaline earth metal salt or the high based salt where the alkaline earth metal content above the normal salt content is provided by finely dispersed and/or chemically bound alkaline earth metal hydroxide or carbonate. Silicone oils are useful anti-foam agents. Usually it is advantageous to employ as viscosity index agents those which do not change the pour point characteristics of the base oil. The amount of the viscosity index improving agents employed can be varied to meet the service requirements of the final formulation. Polyacrylic viscosity index improving compositions and liquid viscous polyolefins such as the liquid polybutenes are specific viscosity index improving agents recognized as being advantageous to use in the preparation of lubricant oil compositions. The amount of these viscosity index improving agents will also vary with the composition of the solvent present in the solution of the amine acylated with sulfurized polybutenyl succinic anhydride for some of these solutions as hereinbefore stated contain as part of their solvent a polybutene corresponding in molecular weight to the polybutenyl substituent in the acylated amine product.

The following lubricant oil compositions wherein all parts are parts by weight are illustrative of lubricant oil formulations useful as crankcase lubricants according to this invention. In all of the following illustrative lubricant oil formulations the zinc dialkyl dithiophosphate additive is one having as its alkyl groups isopropyl groups and oxodecyl groups in the mole ratio of 65 mole percent isopropyl and 35 mole percent oxo-decyl. The zinc dialkyldithiophosphate is indicated as 60 or 70% zinc salt concentrate which concentrate contains the zinc salt dissolved in solvent extracted SAE 5W oil in an amount of 40 to 30 weight percent, respectively, of the solution. The other additives except the products of this invention are also the designated concentrates of the additive dissolved in solvent extracted SAE 5W oil. It will be understood that where the content of the additive is given, the remainder of the concentrate is said oil diluent.

Lubricant oil composition A: Parts
Base oil mixture for SAE 20 oil _____ 86.5
Product of Example 4 (40% concentrate) ____ 7.5
Zinc dialkyldithiophosphate (60% zinc salt concentrate) _____ 2.65
Calcium salt of mahogany acid (30% Ca soap centrate) _____ 3.35

Lubricating oil composition B:
Base oil mixture for SAE 20 oil _____ 82.0
Product of Example 2 (52.7% concentrate) ___ 9.5
Zinc dialkyldithiophosphate (60% concentrate) _____ 3.5
Magnesium sulfonate (40% Mg soap concentrate) _____ 5.0

Lubricating oil composition C:

Base oil mixture for SAE 10 _____ 94.5
Product of Example 2 (52.7% concentrate) ___ 3.5
Zinc dialkyldithiophosphate (60% concentrate) _____ 2.0

SAE 10–30 lubricating oil composition D:
Base oil mixture solvent extracted SAE 5W and 10 oils _____ 71.0
Product of Example 3 (60% concentrate) ____ 10.0
Zinc dialkyldithiophosphate (70% concentrate) _____ 2.0
Barium salt of $P_2S_5$-hydrocarbon reaction product (50% concentrate) _____ 6.0
Polybutene viscosity index improver _____ 9.0
Acrylic polymer viscosity index improver _____ 2.0
Silicone oil anti-foam agent _____p.p.m__ 100

To illustrate the bearing metal corrosion resistance additionally imparted by the amine acylation detergent-dispersant products of this invention there are tested in a standardized bearing metal corrosion test known as Stirring Sand Corrosion Test, Lubricant Oil Composition C and two Comparative Formulations. The two Comparative Formulations contain the ingredients tabulated below and are indicated herein as Comparative Formulation X and Comparative Formulation Y.

Comparative formulation X: Parts
Base oil mixture for SAE 10–30 oil _____ 72.75
50% concentrate containing polybutenyl succinic anhydride acylated tetraethylene pentamine, a phosphorus and sulfur containing additive and boron as boric acid _____ 8.0
Barium oxide neutralized $P_2S_5$-SAE 5W mineral oil reaction product as 50% concentrate in SAE 5W oil _____ 6.0
Zinc dialkyl (35 mole percent isopropyl-65% oxo-decyl) dithiophosphate as 70% concentrate in SAE 5W oil _____ 2.0
Bis octyl thiadiazole corrosion inhibitor _____ 0.25
Polybutene viscosity index improver _____ 9.0
Polyacrylic viscosity index improver _____ 2.0

Comparative formulation Y:
50% concentrate in mixture of SAE 5W oil ___ 94.0
Polybutene (M.W. 850) of borated disuccinimide of tetraethylene pentamine acylated with polybutenyl succinic anhydride (M.W. 950) _ 4.0
60% concentrate of zinc dialkyl (35 mole % isopropyl-65 mole % oxo-decyl) dithiophosphate _____ 2.0

*Stirring sand corrosion test*

This test is employed to evaluate the effectiveness of lubricant oil additives to inhibit corrosion of copper and/or lead-containing bearing metals. In this test a copper-lead test specimen is lightly abraded with steel wool, washed with naphtha, dried and weighed to the nearest milligram. The cleaned copper-lead test specimen is suspended in a steel beaker, cleaned with a hot trisodium phosphate solution, rinsed with water, and acetone and dried, and 250 grams of the oil to be tested together with 0.625 gram lead oxide and 50 grams of a 30–35 mesh sand charged to the beaker. The beaker is then placed in a bath or heating block and heated to a temperature of 300° F. (± 2° F.) while the contents are stirred by means of a stirrer rotating at 750 r.p.m. The contents of the beaker are maintained at this temperature for the designated period of time, in this case 72 hours, after which the copper-lead test specimen is removed, rinsed with naphtha, dried and weighed. The lead oxide is added to simulate lead blow-by from leaded fuels.

*Results of stirring sand corrosion test*

Formulation: Bearing weight loss in milligrams after 72 hours
Lubricant oil formulation C _____ 72
Comparative formulation X _____ 184
Comparative formulation Y _____ 50

The acylated amine products of this invention and more specifically the products obtained from the sulfurized polybutenyl succinic anhydride and tetraethylene pentamine are sufficiently effective detergent-dispersant type additives for crankcase lubricant oil compositions to provide, in the additive weight range in such formulations of from 1 to 10 parts by weight, protection against sludge and varnish deposits to permit the formulation of lubricant oil compositions passing standardized tests which measure sludge and varnish deposit on engine parts. The presence of sulfur in the compound also provides some extreme pressure lubricant protection. Thus the products of this invention can impart to lubricant oil formulations properties which heretofore have been obtained by the use of two or more different types of lubricant oil additives.

What is claimed is:

1. A mineral oil-soluble sulfur containing acylated amine product obtained from the acylation reaction of 0.5 to 1.0 mole of a polyalkylene polyamine selected from the class consisting of polyethylene polyamines and polypropylene polyamines having 1 to 4 of said alkylene groups and from 2 to 5 nitrogens per mole of sulfurized alkenyl succinic anhydride whose alkenyl group before sulfurization has at least 50 carbon atoms and whose sulfur content corresponds to from 0.5 to 2.0 gram atom of sulfur per mole of the alkenyl succinic anhydride under acylation conditions favoring imide formation.

2. The acylated amine product of claim 1 wherein said sulfurized alkylene succinic anhydride is sulfurized polybutenyl succinic anhydride and said polyalkylene polyamine is said polyethylene polyamine.

3. The acylated amine product of claim 1 wherein said sulfurized alkylene succinic anhydride is sulfurized polybutenyl succinic anhydride whose polybutenyl group before sulfurization has a molecular weight in the range of from 700 to 1500 and whose sulfur content is about the ratio of one gram atom per mole and the polyalkylene polyamine is tetraethylene pentamine.

4. A method of preparing a mineral oil-soluble sulfur containing acylated amine product which comprises reacting at a temperature above 300° F. from 0.5 to 2.0 gram atom sulfur with each mole alkenyl succinic anhydride whose alkenyl group has at least 50 carbon atoms and thereafter under conditions favoring imide formation reacting for each mole of said sulfurized alkenyl succinic anhydride from 0.5 to 1.0 mole of a polyalkylene polyamine selected from the class consisting of polyethylene polyamines and polypropylene polyamines having 1 to 4 of said alkylene groups of from 2 to 5 nitrogens.

5. The method of claim 4 wherein said sulfurized alkenyl succinic anhydride is sulfurized polybutenyl succinic anhydride whose polybutenyl group before sulfurization has a molecular weight in the range of 700 to 1500 and wherein said polyalkylene polyamine is a polyethylene polyamine.

6. The method of claim 5 wherein said polyethylene polyamine is tetraethylene pentamine employed in an amount to provide about 0.5 mole per mole of said sulfurized polybutenyl succinic anhydride.

7. A lubricant oil addition agent concentrate consisting essentially of 40 to 60 percent by weight of the sulfur containing acylated amine product of claim 1 and 60 to 40 percent by weight of mineral oil.

8. A lubricant oil addition agent concentrate consisting essentially of 40 to 60 percent by weight of the product obtained by the acylation of 0.5 to 1.0 mole tetraethylene pentamine under conditions favoring imide formation with sulfurized polybutenyl succinic anhydride having about one gram atom sulfur per mole and whose polybutenyl group before sulfurization has a molecular weight in the range of 700 to 1500.

9. A lubricant mineral oil composition having dissolved therein as its essential detergent-dispersant and anti-corrosion agents from 1 to 10 percent by weight of the total composition a sulfurized acylated amine product of claim 1.

10. A lubricant mineral oil composition having dissolved therein as its essential detergent-dispersant and anti-corrosion agents from 1 to 10 percent by weight of the total composition polyethylene polyamine having 1 to 4 ethylene groups of 2 to 5 nitrogens acylated with sulfurized polybutenyl succinic anhydride whose sulfur content is from 0.5 to 2.0 gram atom sulfur per mole and whose polybutenyl group before sulfurization has a molecular weight in the range of from 700 to 1500 and said polyethylene polyamine is present in the mole ratio of 0.5 to 1.0 mole per mole of said sulfurized polybutenyl succinic anhydride.

11. A lubricant mineral oil composition having dissolved therein as its essential detergent-dispersant and anti-corrosion agents from 1 to 10 percent by weight of the total composition the disuccinimide of tetraethylene pentamine wherein the succinimide groups are derived from sulfurized polybutenyl succinic anhydride having about one gram atom of sulfur per mole and having a polybutenyl group before sulfurization of a molecular weight in the range of from 700 to 1500.

References Cited by the Examiner

UNITED STATES PATENTS

| | | | |
|---|---|---|---|
| 3,184,411 | 5/1965 | Lowe | 252—46.7 |
| 3,185,646 | 5/1965 | Anderson et al. | 252—46.7 |
| 3,185,647 | 5/1965 | Anderson et al. | 252—46.7 |

DANIEL E. WYMAN, *Primary Examiner.*

L. G. XIARHOS, *Assistant Examiner.*